US010243402B2

(12) United States Patent
Park et al.

(10) Patent No.: US 10,243,402 B2
(45) Date of Patent: *Mar. 26, 2019

(54) PORTABLE TERMINAL HAVING A WIRELESS CHARGER COIL AND ANTENNA ELEMENT

(71) Applicant: SAMSUNG ELECTRONICS CO., LTD., Suwon-si, Gyeonggi-do (KR)

(72) Inventors: Jin-Hyoung Park, Wonju-si (KR); Ki-Hyun Kim, Suwon-si (KR); Kil-Soo Ko, Suwon-si (KR); Se-Ho Park, Suwon-si (KR); Sung-Kweon Park, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,616

(22) Filed: Mar. 29, 2018

(65) Prior Publication Data
US 2018/0219417 A1    Aug. 2, 2018

Related U.S. Application Data

(63) Continuation of application No. 15/004,287, filed on Jan. 22, 2016, now Pat. No. 9,985,478, which is a (Continued)

(30) Foreign Application Priority Data

Aug. 8, 2011 (KR) ........................ 10-2011-0078611

(51) Int. Cl.
*H01M 10/46* (2006.01)
*H02J 50/10* (2016.01)
(Continued)

(52) U.S. Cl.
CPC .............. *H02J 50/10* (2016.02); *H01F 38/14* (2013.01); *H02J 7/00* (2013.01); *H02J 7/0044* (2013.01);
(Continued)

(58) Field of Classification Search
CPC .......... H02J 7/355; H02J 7/0042; H02J 7/025; H02J 5/005; H02J 7/0045
(Continued)

(56) References Cited

U.S. PATENT DOCUMENTS 7,912,520 B2   3/2011   Choi et al.
7,948,208 B2   5/2011   Partovi et al.
(Continued)

FOREIGN PATENT DOCUMENTS

JP   2006-005836   1/2006
JP   2009-247125   10/2009
(Continued)

OTHER PUBLICATIONS

Decision to Grant dated Apr. 12, 2018 in counterpart Korean Patent Application No. 10-2011-0078611.
(Continued)

*Primary Examiner* — Edward Tso
(74) *Attorney, Agent, or Firm* — Nixon & Vanderhye, P.C.

(57) ABSTRACT

A portable terminal is provided. The portable terminal includes a shielding member attached to an inner surface of an external part, a shielding wall formed on the shielding member, a first coil attached to a surface of the shielding member that faces the inner surface of the external part, and a second coil attached to the surface of the shielding member, with the second coil surrounds the first coil on a same plane and the shielding wall being disposed between the first and second coil.

17 Claims, 4 Drawing Sheets

Related U.S. Application Data continuation of application No. 14/561,939, filed on Dec. 5, 2014, now Pat. No. 9,246,352, which is a continuation of application No. 13/312,359, filed on Dec. 6, 2011, now Pat. No. 8,922,162.

(51) Int. Cl.

| | | |
|---|---|---|
| *H02J 7/00* | (2006.01) | |
| *H02J 7/02* | (2016.01) | |
| *H04M 1/02* | (2006.01) | |
| *H01F 38/14* | (2006.01) | |
| *H04B 5/00* | (2006.01) | |
| *H02J 7/04* | (2006.01) | |
| *H04W 88/02* | (2009.01) | |

(52) U.S. Cl.
CPC ............... *H02J 7/025* (2013.01); *H02J 7/04* (2013.01); *H04B 5/00* (2013.01); *H04B 5/0037* (2013.01); *H04B 5/0075* (2013.01); *H04B 5/0081* (2013.01); *H04B 5/0087* (2013.01); *H04M 1/0262* (2013.01); *H04W 88/02* (2013.01); *H04M 2250/04* (2013.01)

(58) Field of Classification Search
USPC .................. 320/107, 108, 114, 115; 307/104; D13/107, 108
See application file for complete search history.

(56) References Cited

U.S. PATENT DOCUMENTS

| | | | |
|---|---|---|---|
| 7,986,272 | B2 | 7/2011 | Kurashima et al. |
| 8,766,484 | B2 | 7/2014 | Baarman et al. |
| 8,922,162 | B2 | 12/2014 | Park |
| 9,246,352 | B2 | 1/2016 | Park |
| 9,985,478 | B2 * | 5/2018 | Park ..................... H02J 50/10 |
| 2005/0156902 | A1 | 7/2005 | McPherson |
| 2009/0284227 | A1 | 11/2009 | Mohammadian et al. |
| 2011/0025264 | A1 | 2/2011 | Mochida et al. |
| 2011/0050164 | A1 | 3/2011 | Partovi et al. |
| 2012/0146576 | A1 | 6/2012 | Partovi |
| 2013/0043833 | A1 | 2/2013 | Katz et al. |

FOREIGN PATENT DOCUMENTS

| | | |
|---|---|---|
| JP | 4605504 | 1/2011 |
| JP | 5773224 | 7/2015 |
| KR | 10-2009-0129384 | 12/2009 |
| KR | 10-2010-0120057 | 11/2010 |
| KR | 10-2011-0035196 | 4/2011 |
| KR | 10-2011-0066827 | 6/2011 |
| KR | 10-1243592 | 3/2013 |

OTHER PUBLICATIONS

Office Action dated Sep. 1, 2017 in counterpart Korean Patent Application 10-2011-0078611 and English-language translation.

\* cited by examiner

PORTABLE TERMINAL HAVING A WIRELESS CHARGER COIL AND ANTENNA ELEMENT

CROSS-REFERENCE TO RELATED APPLICATIONS

This application is a continuation of U.S. application Ser. No. 15/004,287, filed on Jan. 22, 2016, which is a continuation application of U.S. patent application Ser. No. 14/561, 939, filed on Dec. 5, 2014, now U.S. Pat. No. 9,246,352, which is a continuation application of U.S. patent application Ser. No. 13/312,359, filed on Dec. 6, 2011, now U.S. Pat. No. 8,922,162, which is based on and claims priority under 35 U.S. § 119 to Korean Patent Application No. 10-2011-0078611, filed on Aug. 8, 2011 in the Korean Intellectual Property Office. The contents of each of these applications are incorporated by reference herein in their entirety.

BACKGROUND

1. Field of the Invention

The present invention relates to a portable terminal, and more particularly, to a portable terminal having a secondary coil for wireless charging, as well as a plurality of antenna elements.

2. Description of the Related Art

In general, a portable terminal is a device capable of performing a mobile communication function, an electronic note function, Internet access, and a multimedia function, among other functions, while being carried by a user. Recently, various functions have been integrated in a single mobile communication terminal called a smart phone.

Meanwhile, a transport card, a security card, a credit card, and the like can be used to make payment or to authenticate a user by a Near Field Communication (NFC) function. As portable terminals have become a daily commodity, they are equipped with the NFC function. Accordingly, a portable terminal is provided with an additional antenna for performing the NFC function. Compared to short-range wireless communication, such as Bluetooth™ or Zigbee™ functions, the NFC technology provides an advantage of fast communication setup between communication devices. Despite this advantage, the NFC function communicates at a relatively low frequency of 13.56 MHz, making it important to be within recognition distance to implement the NFC function in a portable terminal.

To supply power to the portable terminal, a detachable battery pack or a built-in battery pack is used. A user charges the battery pack according to the remaining amount of battery power, generally, using a separate charger. To increase user convenience, efforts have been made to commercialize wireless charging. For wireless charging, inductive coupling using a magnetic field, capacitive coupling using an electrical field, and radio frequency wave radiation are available. Among them, the inductive coupling scheme is suitable for wireless charging in terms of power efficiency. According to the inductive coupling scheme, a battery pack is wirelessly charged by aligning a primary coil of a charger with a secondary coil of a portable terminal.

To implement both the NFC function and the wireless charging function in a single portable terminal, an NFC antenna element taking the form of a loop antenna and a secondary coil for wireless charging should be mounted in the portable terminal. A shielding body is used to prevent interference between the antenna element and the secondary coil, and to protect from interference caused by the secondary coil on other circuits of the portable terminal when the antenna element and the secondary coil simultaneously operate. However, the use of a shielding body for each of the antenna element and the secondary coil increases the thickness of the portable terminal. Although the secondary coil for wireless charging may be utilized as the NFC antenna element, it is difficult to achieve both wireless charging efficiency and a recognition distance for NFC. Moreover, since the shielding body is usually formed by rolling to be in a planar form, it is difficult to fix a spirally wound coil or an antenna element having the same structure.

SUMMARY

An aspect of the present invention addresses at least the problems and/or disadvantages and to provide at least the advantages described below, and provides a portable terminal having a shielding member attached to an inner surface of an external part, a shielding wall formed on the shielding member, a first coil attached to a surface of the shielding member that faces the inner surface of the external part, and a second coil attached to the surface of the shielding member, with the second coil surrounding the first coil on a same plane and with the shielding wall disposed between the first and second coil.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
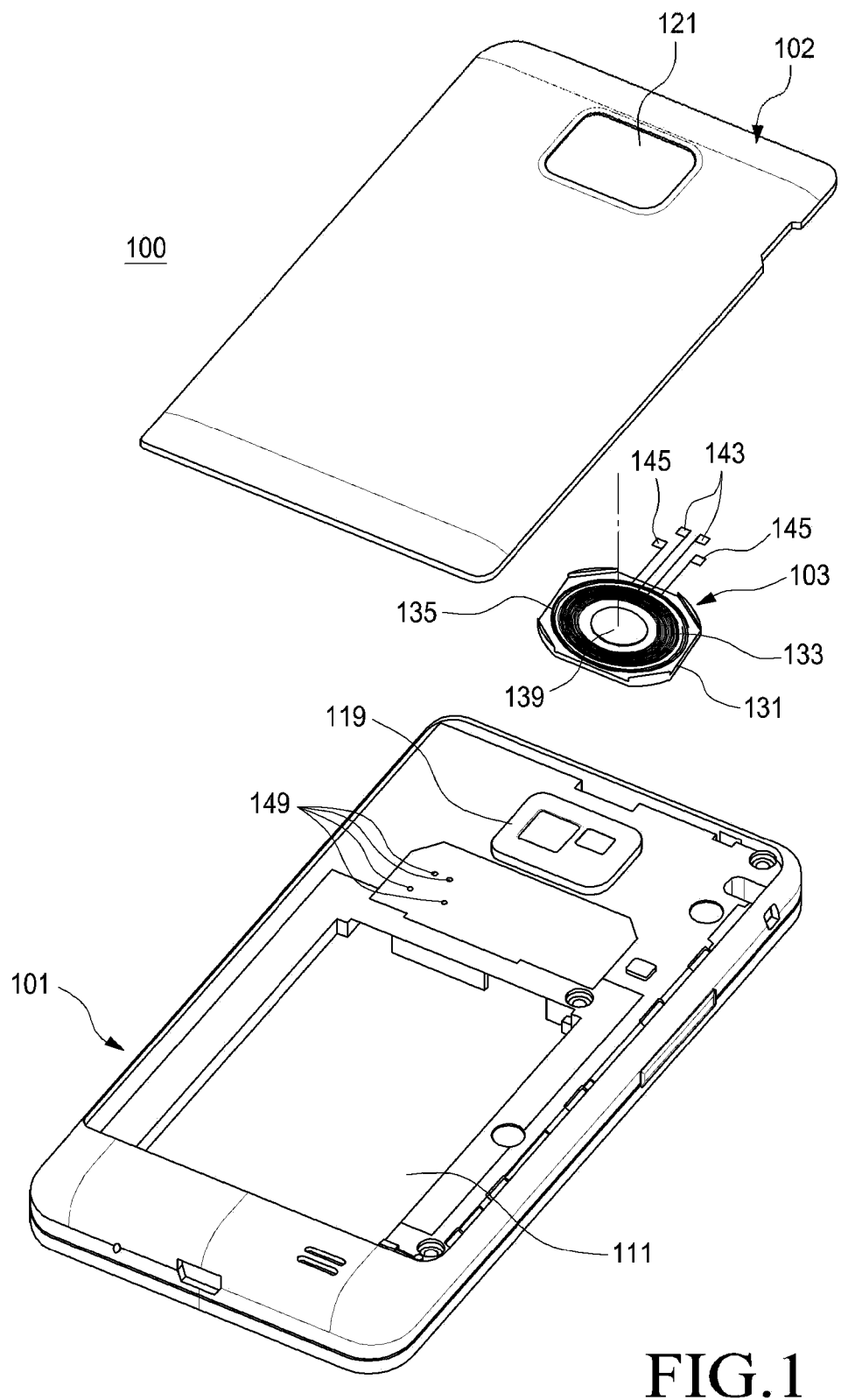
FIG. 1 is an exploded perspective view of a portable terminal according to an embodiment of the present invention.

Reference will now be made in detail to embodiments of the present invention with reference to the accompanying drawings. In the drawings, the same reference numerals will be understood to refer to the same elements, features and structures. In addition, a detailed description of a generally known function and structure of the present invention will be avoided lest it should obscure the subject matter of the present invention.

Figure 2:
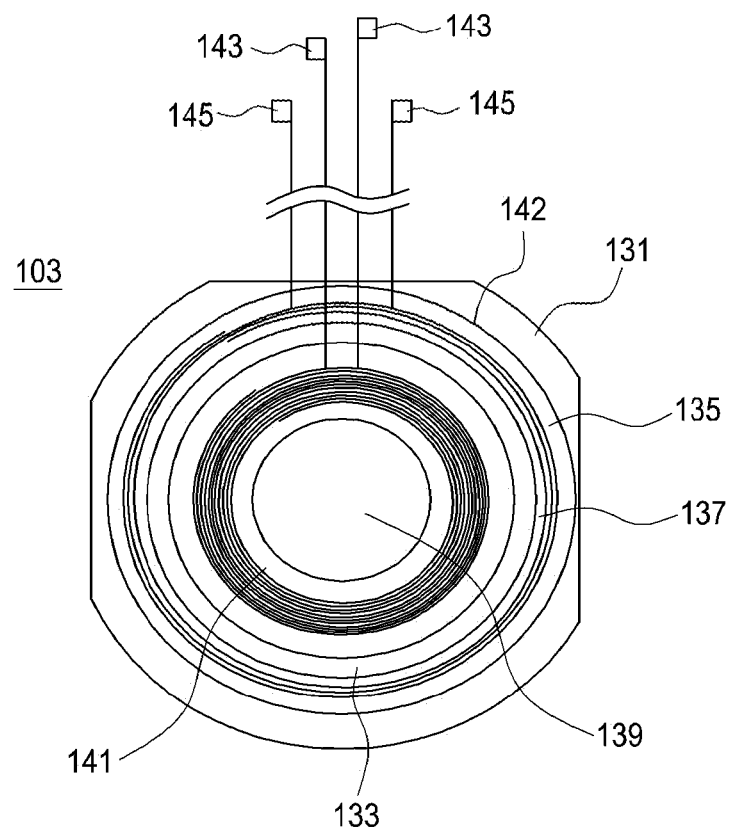
FIG. 2 is a plan view of a coil module in the portable terminal of FIG. 1.
Figure 3:
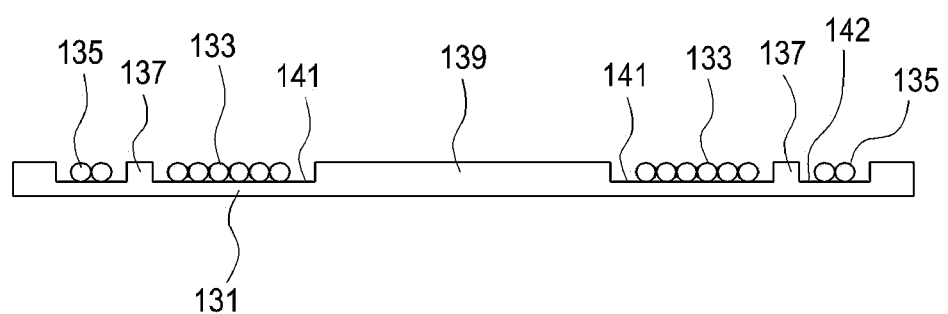
FIG. 3 is a sectional view of the coil module of FIG. 2.

Referring to FIGS. 1-3, a portable terminal 100 according to an embodiment of the present invention includes a shielding member 131 attached to an inner surface of an external part such as a battery cover 102 or a housing 101, and a pair of coils 133 and 135 attached to the shielding member 131. The coils 133 and 135 are mounted on the same plane. The shielding member 131 and the coils 133 and 135 are collectively referred to herein as a coil module 103.

Referring to FIG. 1, the portable terminal 100 is a bar type terminal having a touch screen display. While not shown, the display, function keys such as Start/End and Select keys, a transmitter, and a receiver are installed on a front surface of the housing 101.

The housing 101 is provided on a rear surface of the portable terminal 100, with a battery mounting recess 111 for accommodating a battery pack. The battery cover 102 covers the battery mounting recess 111. A plurality of terminals 149 and a camera module 119 are installed at one side of the battery mounting recess 111, with the terminals 149 also being covered by the battery cover 102. An opening 121 penetrates through both surfaces of the battery cover 102. The camera module 119 is accommodated in the opening 121, thereby securing a capturing path. A connector terminal, a memory slot, a volume key, and a camera shutter switch (not shown) may be arranged on a side surface of the housing 101.

The coil module 103 is attached to the inner surface of the battery cover 102 and connected to circuits of the portable terminal 100, for example, a communication circuit or a charging circuit via the plurality of terminals 149. As illustrated in FIGS. 1-3, the coil module 103 includes the shielding member 131 and the coils 133 and 135.

The shielding member 131 may be formed by injection molding, having first and second accommodation grooves 141 and 142 on a surface thereof. The first and second accommodation grooves 141 and 142 are circular in shape and recessed into one surface of the shielding member 131. The second accommodation groove 142 surrounds the first accommodation groove 141, being concentric with the first accommodation groove 141. A shielding wall 137 is interposed between the first and second accommodation grooves 141 and 142.

A pellet being a mixture of metal powder containing an iron (Fe) component and synthetic resin is injection-molded into the shielding member 131. The synthetic resin is preferably Poly Carbonate (PC), Poly Amide (PA), Acrylonitrile-Butadiene-Styrene (ABS) copolymer, or Nylon. As stated above, the shielding member 131 contains the iron component which prevents mutual interference between the coils 133 and 135, and prevents the coils 133 and 135 from impacting circuits within the portable terminal 100, caused by electronic waves generated from high-frequency waves, low-frequency waves, or power applied to the coils 133 and 135.

As shown in FIGS. 2-3, the first coil 133 is accommodated in the first accommodation groove 141 and the second coil 135 is accommodated in the second accommodation groove 142. The first and second coils 133 and 135 are formed by spirally winding enamel-insulated conductor wires.

As the first and second coils 133 and 135 are accommodated in the first and second accommodation grooves 141 and 142, respectively, and the second coil 135 surrounds the first coil 133. Herein, the shielding wall 137 between the first and second coils 133 and 135 provides a shielding effect between the coils. In other words, the shielding wall 137 shields interference of electronic waves between the first and second coils 133 and 135. The first and second coils 133 and 135 have connection ends 143 and 145, respectively, extended from one side of the shielding member 131. The connection ends 143 and 145 are connected to circuits of the portable terminal 100 via the plurality of terminals 149 provided on the housing 101.

When installed, the first and second coils 133 and 135 are exposed from one surface of the shielding member 131. However, the first and second coils 133 and 135 face the inner surface of the battery cover 102 when the shielding member 131 is attached to the battery cover 102, thereby covering the first and second coils 133 and 135. Consequently, the first and second coils 133 and 135 are covered by the shielding member 131 and the battery cover 102.

One of the first and second coils 133 and 135 may be used as a secondary coil for wireless charging and the other coil may be used as an NFC antenna element. The coils 133 and 135 may also be used as antennas for short-range wireless communication, e.g. Bluetooth™ or terrestrial multimedia broadcasting antennas, the embodiments of the present invention utilize the first coil 133 as a secondary coil for wireless charging and utilize the second coil 135 as an NFC antenna element.

For wireless charging, the portable terminal 100 may be cradled on a charging cradle (not shown) to align a primary coil of a charger with the secondary coil of the portable terminal 100 corresponding to the first coil 133. Alternatively, the primary coil is movably mounted in the charging cradle such that when the portable terminal 100 is positioned on the charging cradle, the primary coil is moved to align with the portable terminal 100.

To align the primary coil of the charging cradle with the first coil 133 of the portable terminal 100, the shielding member 131 may have a protrusion portion 139. The protrusion portion 139 protrudes from the first accommodation groove 141 of the shielding member 131. Since the shielding member 131 contains the iron component, the protrusion portion 139 also contains an iron component. That is, because the protrusion portion 139 contains a paramagnetic material, i.e. the iron component, when the protrusion portion 139 is positioned within the magnetic field of a permanent magnet, an attraction force of the permanent magnet pulls on the protrusion portion 139.

The permanent magnet is attached to the primary coil of the charging cradle. When the portable terminal 100 is mounted on the charging cradle, the attraction force between the permanent magnet and the shielding member 131, particularly the protrusion portion 139, aligns the primary coil of the charging cradle with the first coil 133 of the portable terminal 100. Meanwhile, while the protrusion portion 139 contains the iron component and thus has a paramagnetic property, the protrusion portion 139 may have an additional magnetic portion attached on the first accommodation groove 141 to increase the attraction force between the permanent magnet of the primary coil and the shielding member 131. Preferably, the additional magnetic portion is formed of a paramagnetic material.

FIGS. 4 to 9 illustrate configurations of a portable terminal that implements both a wireless charging function and an NFC function using the coil module 103, with the first coil 133 as a secondary coil used for wireless charging and the second coil 135 as an antenna element for NFC, by way of example.

Figure 4:
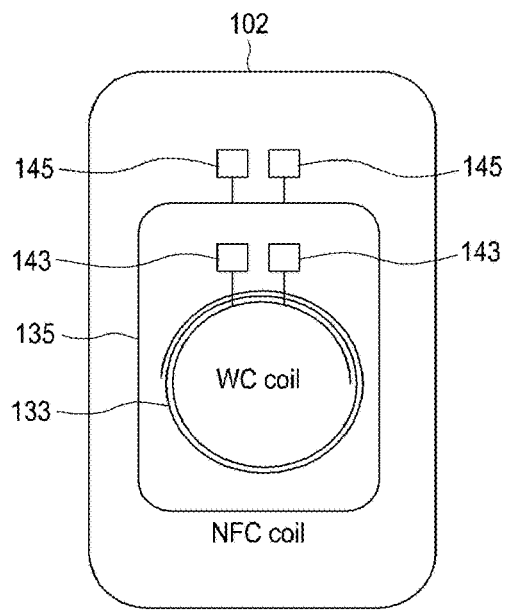
FIG. 4 illustrates mounting of the coil module of FIG. 2 to a battery cover of the portable terminal according to an embodiment of the present invention.
Figure 5:
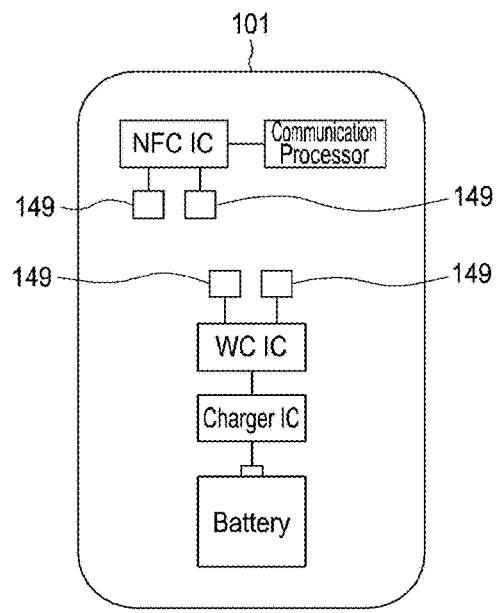
FIG. 5 illustrates the portable terminal with which the battery cover illustrated in FIG. 4 is combinable.

FIG. 4 illustrates mounting of the coil module 103 on the battery cover 102 of the portable terminal 100 according to an embodiment of the present invention and FIG. 5 illustrates the housing 101 to be combined with the battery cover 102 illustrated in FIG. 4.

Figure 6:
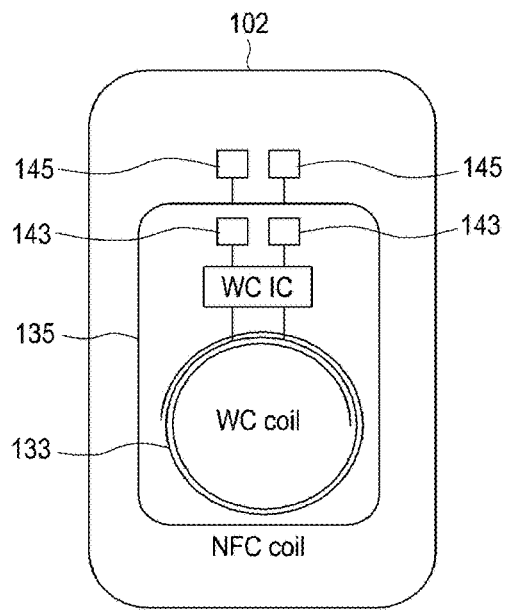
FIG. 6 illustrates mounting of the coil module of FIG. 2 to the battery cover of the portable terminal according to another embodiment of the present invention.
Figure 7:
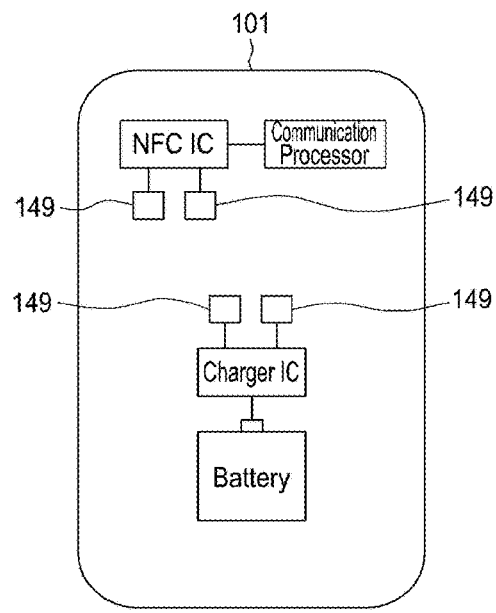
FIG. 7 illustrates the portable terminal with which the battery cover illustrated in FIG. 6 is combinable.

FIG. 6 illustrates mounting of the coil module 103 on the battery cover 102 of the portable terminal 100 according to another embodiment of the present invention and FIG. 7 illustrates the housing 101 to be combined with the battery cover 102 illustrated in FIG. 6.

To implement the wireless charging function and the NFC function using the first and second coils 133 and 135, the first and second coils 133 and 135 are connected to a communication processor and a charge Integrated Circuit (IC), respectively. An NFC IC or a Wireless Charger (WC) IC is disposed on a connection of the first or second coil 133 or 135 to a circuit of the portable terminal 100. These ICs control current and voltage during charging.

In accordance with the embodiment of the present invention illustrated in FIGS. 4 and 5, the NFC IC is connected to the communication processor of the portable terminal 100 and to the second coil 135 mounted to the battery cover 102 via the plurality of terminals 149. The charger IC is installed inside the portable terminal 100 and connected to the battery pack. In addition, the WC IC is connected to the charger IC inside the portable terminal 100 and to the first coil 133 mounted to the battery cover 102 through the remaining plurality of terminals 149.

The embodiments illustrated in FIGS. 4 and 5 and in FIGS. 6 and 7 are substantially identical in configuration, except that the WC IC is installed to the battery cover 102 in the latter embodiment. Thus further detail of the embodiment illustrated in FIGS. 6 and 7 is not repeated herein.

Figure 8:
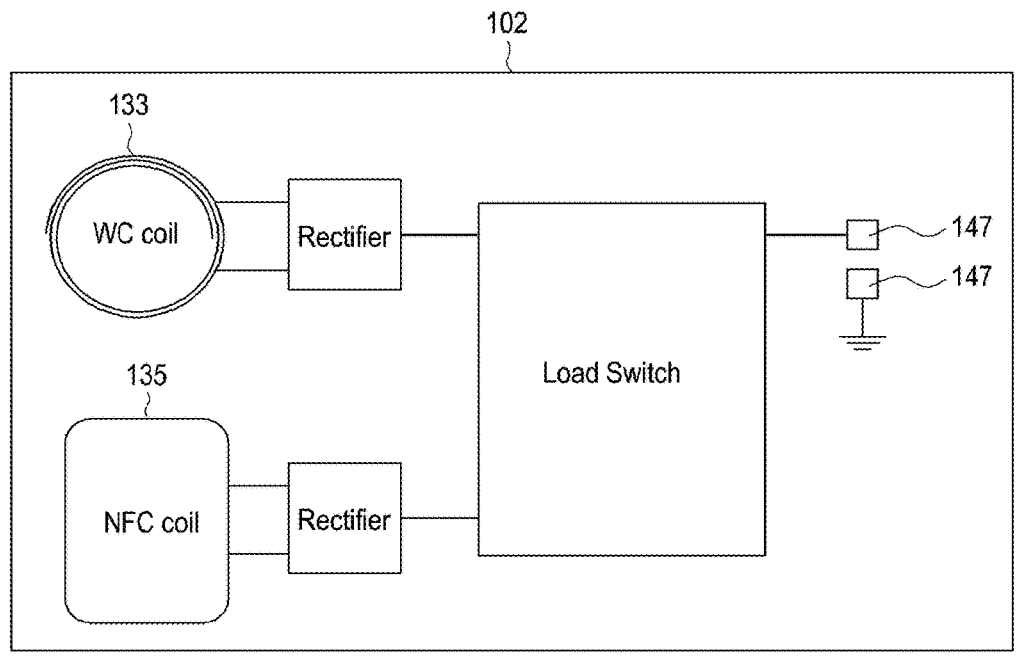
FIG. 8 illustrates mounting of the coil module of FIG. 2 to the battery cover of the portable terminal according to a further embodiment of the present invention.
Figure 9:
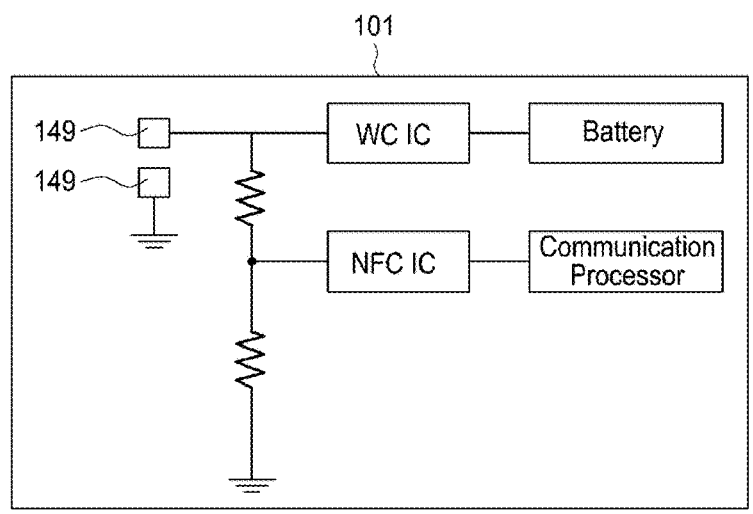
FIG. 9 illustrates the portable terminal with which the battery cover of FIG. 8 is to be combined.

FIG. 8 illustrates mounting of the coil module 103 on the battery cover 102 of the portable terminal 100 according to a further embodiment of the present invention, and FIG. 9 illustrates the housing 101 to be combined with the battery cover 102 of FIG. 8.

Referring to FIGS. 8 and 9, the first and second coils 133 and 135 share connection ends 147 and only a pair of terminals 149 are installed on the housing 101. In this case, even though power is supplied and signals are transmitted through the shared connection ends 147 and the pair of terminals 149, a load switch may prevent signal or power interference on lines. Since more power is supplied through a line during wireless charging than during powering of a signal for the NFC function, the load switch prevents the wireless charging power from influencing the NFC line or the second coil 135.

As illustrated in FIGS. 4 to 9, those of skill in the art will recognize that a rectifier or a charger IC can be selectively disposed in connecting the first and second coils 133 and 135 configured as a secondary coil for wireless charging and an antenna element for the NFC function to circuits of the portable terminal 100.

When the wireless charging function and the NFC function are implemented using the coil module of the present invention, approximately 71% power efficiency can be achieved during wireless charging and a recognition distance of about 25 mm can be secured for the NFC function. As the first and second coils are positioned on a same plane, the increase of the thickness of the portable terminal is minimized and both the wireless charging function and the NFC function can be implemented in a single terminal.

As is apparent from the above description, the portable terminal according to the present invention has a first coil for wireless charging and a second coil for the NFC function on the same plane. Therefore, both the wireless charging function and the NFC function can be implemented in the portable terminal without increasing the thickness of the portable terminal. Since grooves for accommodating the first and second coils are formed in a shielding member, spirally wound first and second coils can be readily fixed herein. Furthermore, a shielding wall being a part of the shielding member isolates the first and second coils from each other, thereby preventing mutual interference between the first and second coils. As a consequence, high power efficiency and a sufficient recognition distance can be achieved for the wireless charging function and the NFC function, respectively.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An electronic device comprising:
    a battery;
    a circuit board;
    a first coil, provided at an inside of the electronic device, for generating power based on an energy field provided from a wireless power transmitting device;
    a second coil, provided at the inside of the electronic device, for use in performing near field communication (NFC);
    circuitry comprising a first circuit and a second circuit, wherein the first circuit is configured to control charging of the battery using the power generated at the first coil, and the second circuit is configured to control performing of the NFC through the second coil, wherein the circuitry is located at the circuit board;
    a magnetic shield disposed between the circuitry and at least one of the first coil or the second coil; and
    first coil connection ends and second coil connection ends provided at the inside of the electronic device and respectively connected to the first coil and the second coil,
    wherein the first coil connection ends and the second coil connection ends are respectively connected to the first circuit and the second circuit via a plurality of terminals.

2. The electronic device of claim 1,
    wherein the first coil is a secondary coil for inductive coupling the wireless power transmitting device.

3. The electronic device of claim 1, wherein the first circuit includes a wireless charging control circuit, and
    wherein the first coil is connected to the battery via the wireless charging control circuit.

4. The electronic device of claim 1, further comprising a magnetic piece attached to a surface of the magnetic shield, in an area surrounded by the first coil.

5. The electronic device of claim 1, further comprising:
    a first groove formed in a surface of the magnetic shield; and
    a second groove surrounding the first groove on the surface of the magnetic shield,
    wherein the first coil is disposed in the first groove and the second coil is disposed in the second groove.

6. The electronic device of claim 5, wherein the magnetic shield further comprises a protrusion portion including a paramagnetic material, surrounded by the first groove.

7. The electronic device of claim 5, further comprising a magnetic piece including a paramagnetic material, attached to an area surrounded by the first groove.

8. The electronic device of claim 5, wherein the magnetic shield comprises an injection-molded mixture comprising iron powder and a synthetic resin.

9. The electronic device of claim 8, wherein the synthetic resin is one of Poly Carbonate (PC), Poly Amide (PA), Acrylonitrile-Butadiene-Styrene (ABS) copolymer, and Nylon.

10. The electronic device of claim 1, further comprising a touch screen display.

11. The electronic device of claim 1, wherein the first coil and the second coil are adjacent.

12. The electronic device of claim 11, wherein the first coil and the second coil are on a same plane.

13. The electronic device of claim 12, wherein the first coil and the second coil are concentric.

14. An electronic device comprising:
a battery;
a circuit board;
a first coil, provided at an inside of the electronic device, for generating power based on an energy field provided from a wireless power transmitting device;
a second coil, provided at the inside of the electronic device, for use in performing near field communication (NFC);
circuitry comprising a first circuit and a second circuit, wherein the first circuit is configured to control charging of the battery using the power generated at the first coil, and the second circuit is configured to control performing of the NFC through the second coil, wherein the circuitry is located at the circuit board;
a magnetic shield disposed between the circuitry and at least one of the first coil or the second coil;
a first groove formed in a surface of the magnetic shield;
a second groove surrounding the first groove on the surface of the magnetic shield; and
first coil connection ends and second coil connection ends provided at the inside of the housing and respectively connected to the first coil and the second coil,
wherein the first coil connection ends and the second coil connection ends are respectively connected to the first circuit and the second circuit via a plurality of terminals, and
wherein the first coil is disposed in the first groove and the second coil is disposed in the second groove and the first coil and the second coil are on a same plane.

15. The electronic device of claim 14, wherein the first coil is a secondary coil for inductive coupling the wireless power transmitting device.

16. The electronic device of claim 14, wherein the magnetic shield further comprises a protrusion portion including a paramagnetic material, surrounded by the first groove.

17. The electronic device of claim 14, wherein the magnetic shield comprises an injection-molded mixture comprising iron powder and a synthetic resin.

* * * * *